(12) United States Patent
Schulz

(10) Patent No.: US 8,303,160 B2
(45) Date of Patent: Nov. 6, 2012

(54) DEVICE FOR EXTRUDING A THERMOPLASTIC PRODUCT HAVING SLEEVE FORMING SCREW SECTION OF FLOW ARRESTER AND SCREW WITH SMALL SCREW DIAMETER IN RELATION TO PLASTICIZING SECTION

(75) Inventor: Helmuth Schulz, Linz (AT)

(73) Assignee: EREMA Engineering Recycling Maschinen und Anlagen Gesellschaft m.b.H., Freindorf, Ansfelden (AT)

( * ) Notice: Subject to any disclaimer, the term of this patent is extended or adjusted under 35 U.S.C. 154(b) by 244 days.

(21) Appl. No.: 12/735,428

(22) PCT Filed: Jan. 14, 2009

(86) PCT No.: PCT/AT2009/000009
§ 371 (c)(1),
(2), (4) Date: Jul. 15, 2010

(87) PCT Pub. No.: WO2009/103094
PCT Pub. Date: Aug. 27, 2009

(65) Prior Publication Data
US 2010/0310700 A1 Dec. 9, 2010

(30) Foreign Application Priority Data
Feb. 20, 2008 (AT) .................................. A 270/2008

(51) Int. Cl.
*B29C 47/76* (2006.01)
(52) U.S. Cl. ................. 366/75; 366/87; 366/88; 366/89

(58) Field of Classification Search ............ 366/75, 366/79, 87–89; 425/203, 205, 209, 208
See application file for complete search history.

(56) References Cited

U.S. PATENT DOCUMENTS 3,193,877 A * 7/1965 Edwards .................. 366/75
(Continued)

FOREIGN PATENT DOCUMENTS
AT 400 315 12/1995
(Continued)

OTHER PUBLICATIONS
International Search Report, Jul. 2009.

*Primary Examiner* — Charles E Cooley
(74) *Attorney, Agent, or Firm* — Collard & Roe, P.C.

(57) ABSTRACT

The invention relates to an apparatus for extruding thermoplastic material, comprising an extruder screw (2) which is mounted in a housing (1), comprises a plasticizing section (P) on the inlet side, a degasification section (E) upstream of an outlet section (A), a flow arrester (S) between the plasticizing section (P) and the degasification section (E) with a screw section with a counter-rotating delivery flight (3), and at least one flow channel (5) bridging the flow arrester (S) and containing a melt filter (4). In order to reduce the driving power of the extruder screw (2) it is proposed that a sleeve (7), which encompasses the screw (6) and is mounted in the housing (1) in a rotationally fixed manner, is associated with the screw section that forms the flow arrester (S), and the screw (6) in the screw section of the flow arrester (S) has a smaller screw diameter in relation to the plasticizing section (P) and preferably also to the degasification section (E).

6 Claims, 2 Drawing Sheets

U.S. PATENT DOCUMENTS

| | | | | |
|---|---|---|---|---|
| 3,360,824 | A * | 1/1968 | Schippers | 366/76.92 |
| 4,697,928 | A | 10/1987 | Csongor | |
| 4,730,935 | A * | 3/1988 | Kolossow | 366/82 |
| 5,419,634 | A * | 5/1995 | Bacher et al. | 366/75 |
| 5,651,944 | A * | 7/1997 | Schulz et al. | 422/137 |
| 6,206,558 | B1 * | 3/2001 | Beckwith | 366/78 |
| 6,238,733 | B1 | 5/2001 | Therolf | |
| 6,406,174 | B2 * | 6/2002 | Bacher et al. | 366/82 |
| 7,866,876 | B2 * | 1/2011 | Schulz | 366/75 |
| 2001/0040837 | A1 * | 11/2001 | Bacher et al. | 366/82 |
| 2010/0034917 | A1 * | 2/2010 | Schulz | 425/377 |
| 2010/0310700 | A1 * | 12/2010 | Schulz | 425/209 |

FOREIGN PATENT DOCUMENTS

| | | |
|---|---|---|
| AT | 503 014 | 7/2007 |
| WO | WO 86/02313 | 4/1986 |
| WO | WO 93/04841 | 3/1993 |
| WO | WO 99/25528 | 5/1999 |
| WO | 01/03907 A1 * | 1/2001 |

* cited by examiner

DEVICE FOR EXTRUDING A THERMOPLASTIC PRODUCT HAVING SLEEVE FORMING SCREW SECTION OF FLOW ARRESTER AND SCREW WITH SMALL SCREW DIAMETER IN RELATION TO PLASTICIZING SECTION

CROSS REFERENCE TO RELATED APPLICATIONS

This application is the National Stage of PCT/AT2009/000009 filed on Jan. 14, 2009, which claims priority under 35 U.S.C. §119 of Austrian Application No. A 270/2008 filed on Feb. 20, 2008. The international application under PCT article 21(2) was not published in English.

1. FIELD OF THE INVENTION

The invention relates to an apparatus for extruding thermoplastic material, comprising an extruder screw which is mounted in a housing, comprises a plasticizing section on the inlet side, a degasification section upstream of an outlet section, a flow arrester between the plasticizing section and the degasification section with a screw section with a counter-rotating delivery flight, and with at least one flow channel bridging the flow arrester and containing a melt filter.

2. DESCRIPTION OF THE PRIOR ART

Such apparatuses are used for appropriately degassing and preparing plastic materials, especially plastic waste, which require a degasification and cleaning process prior to further processing. In the treatment of plastic materials from production waste or from the plastic material that has already been in circulation, the necessity arises that these plastic materials are treated prior to re-use as a result of labeling, lacquering or soiling.

It is known for this purpose (WO 93/04841 A1) to melt down the plastic to be treated in an extruder, to press the same through a filter and to degas the same prior to further processing or granulation. In order to avoid a direct transfer of molten plastic material from the plasticizing section to the degasification or outlet section and to ensure that the entire molten plastic is guided through the melt filter, a counter-rotating delivery flight, which means a kind of return-feed thread or a sealing thread, is provided between the plasticizing section and the degasification section, which thread has a pitch which is opposite to the delivery flight of plasticizing section, degasification section and outlet section. As a result of this known return-feed thread, a small part of cleaned plastic material which has already been guided through the melt filter is conveyed back to the plasticizing section, which should help avoid that unfiltered melt will reach the degasification and outlet section directly under avoidance of the melt filter. The openings on the inlet and outlet side of the flow channel containing the melt filter are arranged directly adjacent to the return-feed thread in order to avoid dead spaces. It is intended to prevent that extended dwell times of the plastic material occur in the apparatus, which subsequently would lead to thermal damaging of the plastic material. The disadvantage of this apparatus is especially that the counter-rotating feeding thread concerns a dynamic seal which is tight or not depending on the speed of the extruder screw. The viscosity of the plastic material is also highly relevant because plastic containing humidity will form vapors which cannot be prevented from transferring directly from the plasticizing section to the degasification section through the delivery flight. These vapors are the carriers of dirt particles, among other things, which are introduced past the filter into the degasification section and contaminate the already filtered plastic again, so that it is not possible to ensure an even quality of the degassed and cleaned plastic material.

That is why it has already been proposed (AT 503 014) that the extruder screw is to form a similarly running delivery flight between the counter-rotating delivery flight and the opening of the flow channel on the outlet side and the housing comprises at least one degasification opening between the counter-rotating and concurrent delivery flight. Gas transfers from the plasticizing section to the degasification section through the flow arrester can thus be prevented, thereby preventing contaminations of the plastic compound by the transferred gases as well as pressure fluctuations in the system. The aforementioned apparatus comes with the disadvantage however that the flow arrester with a screw section having a counter-rotating delivery flight leads to a considerably increased driving power for the apparatus and also increased wear and tear of the apparatus.

SUMMARY OF THE INVENTION

Based on a state of the art of the kind as mentioned above, the invention is based on the object of avoiding the mentioned disadvantages and providing an apparatus with improved degasification effect which prevents a direct transfer of material from the plasticizing section to the degasification section through the delivery flight in combination with reduced driving power for the extruder screw and reduced wear and tear at the flow arrester.

This object is achieved by the invention in such a way that a sleeve, which encompasses the screw and is mounted in the housing in a rotationally fixed manner, is allocated to the screw section that forms the flow arrester, and the screw in the screw section of the flow arrester has a smaller screw diameter in relation to the plasticizing section and preferably also to the degasification section.

The sleeve or a bush inserted in a torsion-proof manner in the housing of the apparatus forms the screw section of the flow arrester in combination with the counter-rotating delivery flight, with the reduced diameter of this screw section ensuring a considerable reduction of the required driving power in relation to the downstream screw sections, which are the plasticizing section and preferably also the degasification section, which also leads to a reduction in the wear and tear as a result of the lower power loss. The occurring wear and tear occurs thus predominantly on the sleeve and not on the cylinder. The sleeve can be pulled out of the cylinder jointly with the screw for exchange purposes.

If the largest width of the cross section of the sleeve is smaller than or equal to the outside diameter of the plasticizing section and/or the degasification section and optionally the outlet section, the extruder screw can be jointly installed and removed in the conventional manner along the screw axis together with the sleeve comprising the worm in the region of the screw section forming the flow arrester. The torsion-proof bearing of the sleeve can be ensured by a respective outside shape of the sleeve by grooves, springs, wedges, screws or the like.

The invention offers the possibility of reducing the diameter of the extruder worm in the region of the screw section forming the flow arrester to such an extent that the drive torques required for degassing and delivery can be transferred with the required security.

If a one-piece screw is used as an extruder screw, as is usually the case, it is recommended to arrange the sleeve in a divided manner in at least one plane extending in the direction of the longitudinal axis of the screw in order to enable mounting and dismounting of the sleeve on the conveyor screw or the conveyor screw per se.

In addition or as an alternative to this, the extruder screw can be arranged in at least three parts in the longitudinal direction of the screw, with the individual parts, which are the part of the plasticizing section, the part of the screw section with the flow arrester and the partial section comprising the degasification section and the outlet section, being preferably screwed together along the screw axis. The individual screw sections can thus easily be produced separately and can then be screwed together following preliminary mounting of the sleeve on the screw section forming the flow arrester, thus enabling a combination of a large variety of screw geometries among other things. Moreover, a return-feed thread plus sleeve which will wear off more quickly can be exchanged without having to newly produce the entire extruder screw.

In order to improve the degasification performance, the extruder worm can form a counter-rotating delivery flight in the known manner between the counter-rotating delivery flight and the opening of the flow channel on the outlet side, with the housing preferably comprising at least one degasification opening in the transitional region between the counter-rotating and the concurrent delivery flight. In order to reduce wear and tear of the delivery flight downstream of the plasticizing section as a result of contaminated gases penetrating the delivery flight, it is advantageous when the flow channel on the outlet side of the melt filter is connected by at least one return channel, preferably via a non-return valve, with the counter-rotating delivery flight of the extruder screw on the inlet side. A purposeful low return flow of cleaned plastic can be ensured through the delivery flight to the plasticizing section and thus the penetration of contaminated plastic into the counter-rotating delivery flight can be prevented.

In order to improve the degasification effect, a ductless degasification space can be provided in the sleeve between the counter-rotating and concurrent delivery flight of the extruder screw, which space is formed by the extruder screw and/or the sleeve. Gases which penetrate this region via the counter-rotating and concurrent delivery flight are simply discharged from the apparatus via the degasification opening, through which the desired pressure decoupling is ensured and a transfer of contaminated gases is securely prevented.

BRIEF DESCRIPTION OF THE DRAWING

The invention is shown in the drawing by means of a schematic embodiment of an apparatus in accordance with the invention shown in a cross section, wherein.

DESCRIPTION OF THE PREFERRED EMBODIMENT

Figure 1:
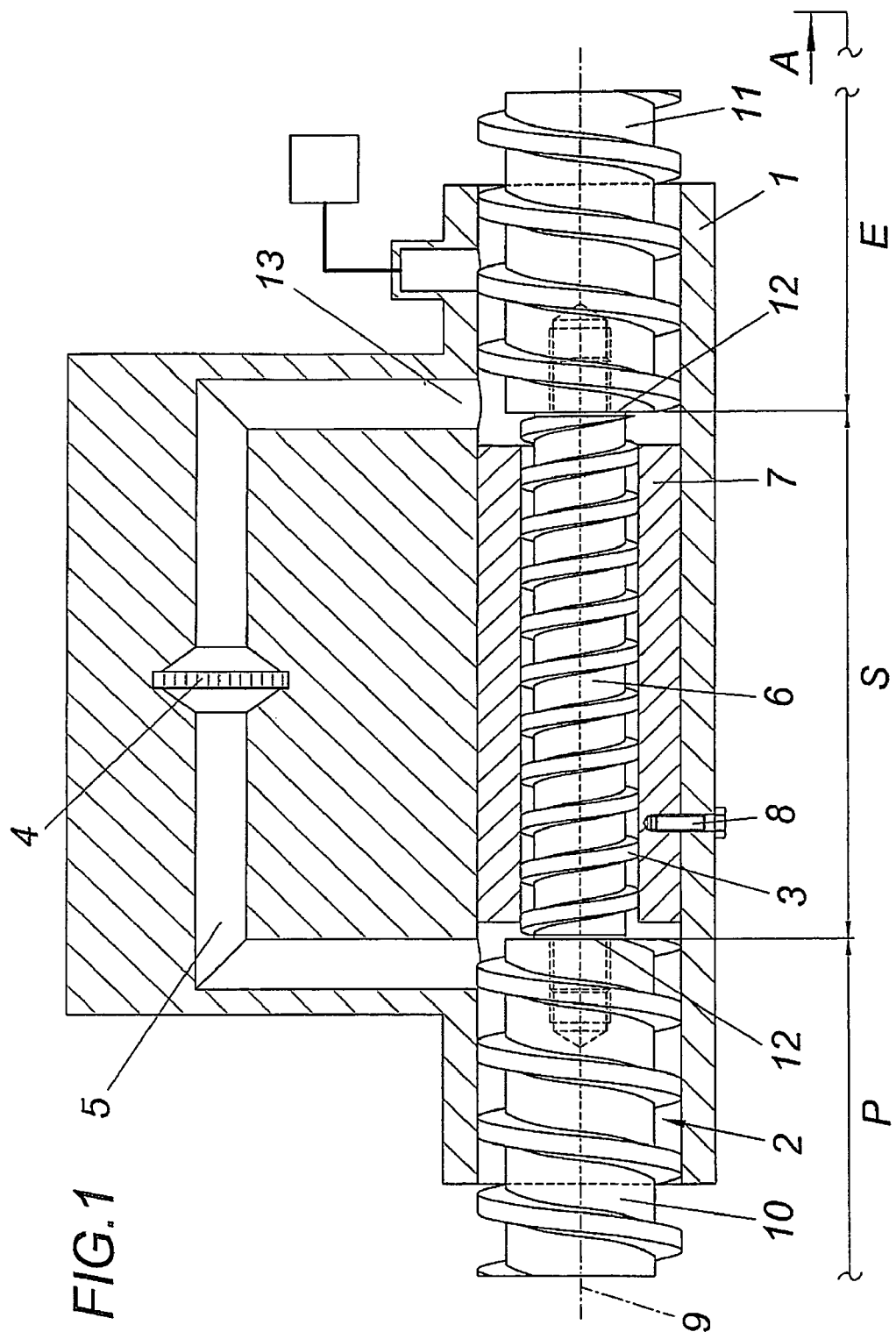
FIG. 1 shows an apparatus in accordance with the invention in a partly sectional cross-sectional view.

An apparatus for extruding thermoplastic material comprises an extruder screw 2 held in a housing 1, which screw comprises a plasticizing section P on the inlet side and a degasification section E upstream of an indicated outlet section A. A screw section forming a flow arrester S with a screw section with counter-rotating delivery flight 3 being provided between the plasticizing section P and the degasification section E. Furthermore, housing 1 comprises at least one flow channel 5 which bridges the flow arrester S and contains a melt filter 4. In order to reduce the driving power and the wear and tear of the extruder screw 2, the screw section forming the flow arrester S is associated with a sleeve 7 which is held in the housing 1 in a torsion-proof manner and comprises the screw 6, and the screw 6 in the screw section of the flow arrester S has a smaller screw diameter in relation to the plasticizing section P and the degasification section E. The twist protection of the sleeve 7 occurs in the illustrated embodiment by a securing screw 8.

Furthermore, the largest width of the cross section of sleeve 7 is equal to the outside diameter of the screw in the plasticizing section P and in the degasification section E, so that the extruder screw 2 can be mounted and dismounted easily along the extruder screw axis 9 together with the sleeve 7.

The extruder screw 2 is arranged in three parts in the longitudinal direction of the screw in order to enable mounting or simply exchanging only the flow arrester S in the case of wear and tear of the same. The three parts are the part 10 associated with the plasticizing section P, the screw 6 which is associated with the flow arrester S and the part 11 of the extruder screw 2 associated with the degasification section E and the outlet section A. The individual three parts are screwed together by interposing respective washers 12. It may be necessary to cut or saw open the parts in the region of the washers 12 for the purpose of severing the three parts when threads get stuck.

The screw 6 forms a concurrent delivery flight in the embodiment according to FIG. 1 between the counter-rotating delivery flight 3 and the outlet-side opening 13 of the flow channel 5 into the degasification section E. Moreover, the flow channel 5 is connected on the outlet side of the melt filter 4 on the inlet side with the counter-rotating delivery flight 3 of the extruder screw 2 through a return channel 16 via a non-return valve 16. A radial opening 17 is provided for this purpose in the sleeve 7. Furthermore, a ductless degasification space 18 is provided between the counter-rotating delivery flight 3 and the concurrent delivery flight 14, which space is formed by the screw 6 and which opens from the apparatus via a degasification opening 19 in the sleeve 7.

Figure 2:
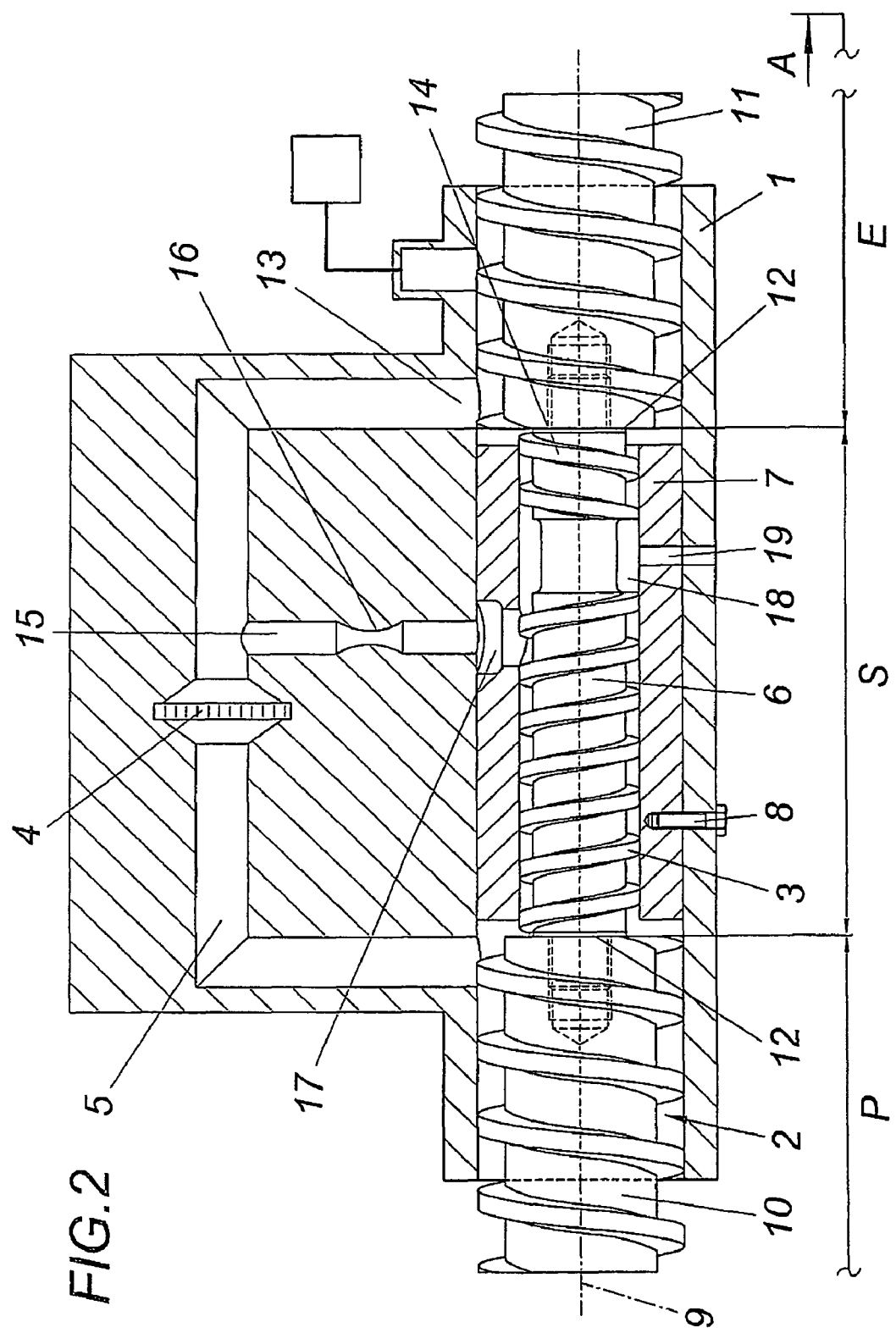
FIG. 2 shows a constructional variant of an apparatus in accordance with the invention in a partly sectional cross-sectional view.

A return channel 15 could be provided similarly as a further alternative in the embodiment according to FIG. 1, with the outlet-side opening 13 of the flow channel 6 preferably opening in the same manner into the part 11 of extruder screw 2 associated with the degasification section E, as shown in FIG. 2.

The invention claimed is:

1. An apparatus for extruding thermoplastic material, comprising an extruder screw which is mounted in a housing, comprises a plasticizing section on the inlet side, a degasification section upstream of an outlet section, a flow arrester between the plasticizing section and the degasification section with a screw section with a counter-rotating delivery flight, and at least one flow channel bridging the flow arrester and containing a melt filter, wherein a sleeve, which encompasses the screw and is mounted in the housing in a rotationally fixed manner, is associated with the screw section that forms the flow arrester, and the screw in the screw section of the flow arrester has a smaller screw diameter in relation to the plasticizing section, and
    wherein the flow channel on the outlet side of the melt filter is connected by at least one return channel, with the counter-rotating delivery flight of the extruder screw on the inlet side via a radial opening of the sleeve.

2. An apparatus according to claim 1, wherein the largest width of the cross section of the sleeve is smaller than or equal to the outside diameter of the screw in the plasticizing section and/or the degasification section.

3. An apparatus according to claim 1, wherein the sleeve is arranged to be divided in at least one plane extending in the direction of the longitudinal axis of the screw.

4. An apparatus according to claim 1, wherein the extruder screw is arranged in three parts in the longitudinal direction of the screw, with the individual parts being screwed together along the screw axis, the parts being the plasticizing section, the screw section with the flow arrester and the section comprising the degasification section and the outlet section.

5. An apparatus for extruding thermoplastic material, comprising an extruder screw which is mounted in a housing, comprises a plasticizing section on the inlet side, a degasification section upstream of an outlet section, a flow arrester between the plasticizing section and the degasification section with a screw section with a counter-rotating delivery flight, and at least one flow channel bridging the flow arrester and containing a melt filter, wherein a sleeve, which encompasses the screw and is mounted in the housing in a rotationally fixed manner, is associated with the screw section that forms the flow arrester, and the screw in the screw section of the flow arrester has a smaller screw diameter in relation to the plasticizing section, and wherein the extruder screw forms a concurrent delivery flight towards the degasification section between the counter-rotating delivery flight and the opening of the flow channel on the outlet side, and the sleeve comprises at least one degasification opening in the transitional region between the counter-rotating and concurrent delivery flight.

6. An apparatus according to claim 5, wherein a ductless degasification space is provided between the counter-rotating and concurrent delivery flight of the extruder screw, which space is formed by the extruder screw and/or the sleeve.

\* \* \* \* \*